Jan. 7, 1947.            C. D. DOSKER            2,413,912
                      ANGULAR GLUED WOOD JOINT
                     Filed April 3, 1944      2 Sheets-Sheet 1

INVENTOR
CORNELIUS D. DOSKER
BY *Arthur J. Robert*
ATTORNEY

Jan. 7, 1947.  C. D. DOSKER  2,413,912
ANGULAR GLUED WOOD JOINT
Filed April 3, 1944  2 Sheets-Sheet 2

INVENTOR
CORNELIUS D. DOSKER
BY *Arthur H. Robert*
ATTORNEY

Patented Jan. 7, 1947

2,413,912

UNITED STATES PATENT OFFICE 2,413,912

ANGULAR GLUED WOOD JOINT

Cornelius D. Dosker, Louisville, Ky., assignor to Gamble Brothers, Louisville, Ky., a corporation of Kentucky Application April 3, 1944, Serial No. 529,365

3 Claims. (Cl. 20—92)

This invention relates to glue wood joints, and is particularly applicable to the angular glue joints of wood trusses and frames.

In angular joints of this character, the angularly disposed timbers are glue bonded directly to each other and good practice requires that this bond be made between major faces of the timbers, i. e., side or edge faces of appropriate area as distinguished from end faces. Normally the angular glue joints used in a glued wood truss or frame will embrace a limited number of different "timber angles," i. e., the angle formed at any one joint by and between the long axes of the timbers joined. It is desirable, however, that the glue bond impart, to all angular glue joints employed in a truss or frame, the same strength per square inch of joined area regardless of the size of the timber angle. There is, of course, no apparent reason why the glue bond should not impart, to an angular joint of one timber angle, the same strength which it imparts to an angular joint of a different timber angle, and the fact that it does has long been taken for granted.

I have made the surprising discovery that the timber angle of a glue joint has a decided effect upon its shear strength. Contrary to the long standing assumption, I have found that there is a progressive loss in shear strength as the size of the timber angle progressively increases and that the shear strength of a joint having a zero timber angle, in which the timbers are parallel to each other, is uniformly and very substantially greater than the shear strength of a joint having a 90° timber angle in which the timbers are at right angles to each other.

The principal object of this invention is to reduce that loss in shear strength of an angular glued wood joint which appears to be due to or occasioned by the timber angle.

Another object is to provide a method of and a means for increasing the shear strength of an angular glued wood joint to a value approaching that obtainable with a zero timber angle and thereby enable all such joints not only to be made of substantially the same strength but also of maximum strength.

Another important object is to provide an inexpensive device which, when appropriately interposed between and glue bonded to the opposed joint areas of the major faces of the timbers thereby joined, substantially reduces the loss in shear strength normally experienced and thereby increases the shear strength of the joint.

The invention is illustrated in the accompanying drawings wherein.

Figure 1:
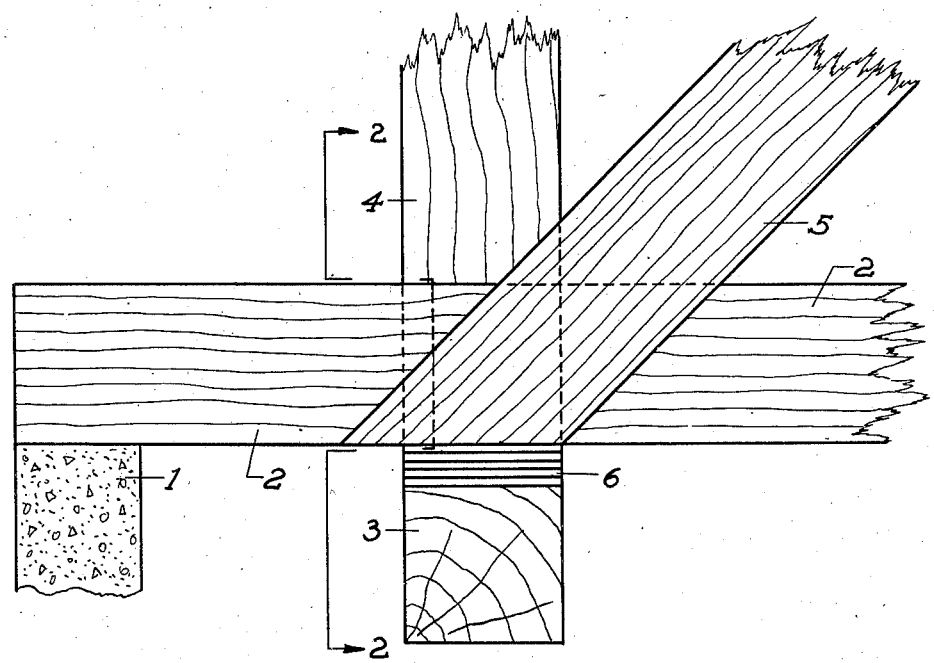
Fig. 1 is a view in elevation of a portion of a glued wood truss to which the invention is applied.
Figure 2:
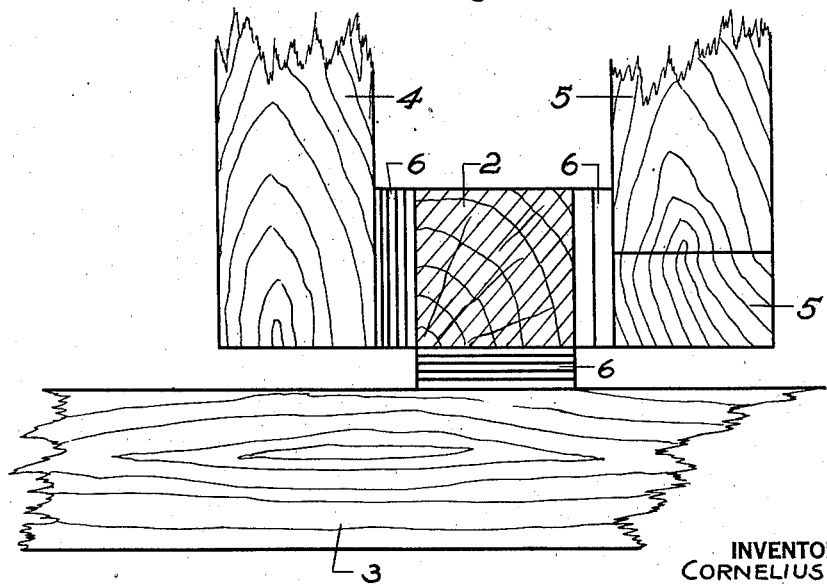
Fig. 2 is a section taken along line 2—2 of Fig. 1.

In the arrangement shown in Figures 1 and 2 a concrete pier 1 supports one end of a wooden truss conventionally composed of horizontal beams 2 and 3, vertical beam 4, and inclined beam 5. The uppermost major face of the horizontal beam 3 is joined to the lowermost major face of the horizontal beam 2. The vertical beam 4 and inclined beam 5 are likewise joined to opposite vertically disposed major faces of the horizontal beam 2. The timber angle between beam 2 and each of the beams 3 and 4 is 90° while that between beams 2 and 5 is 45°.

Figure 3:
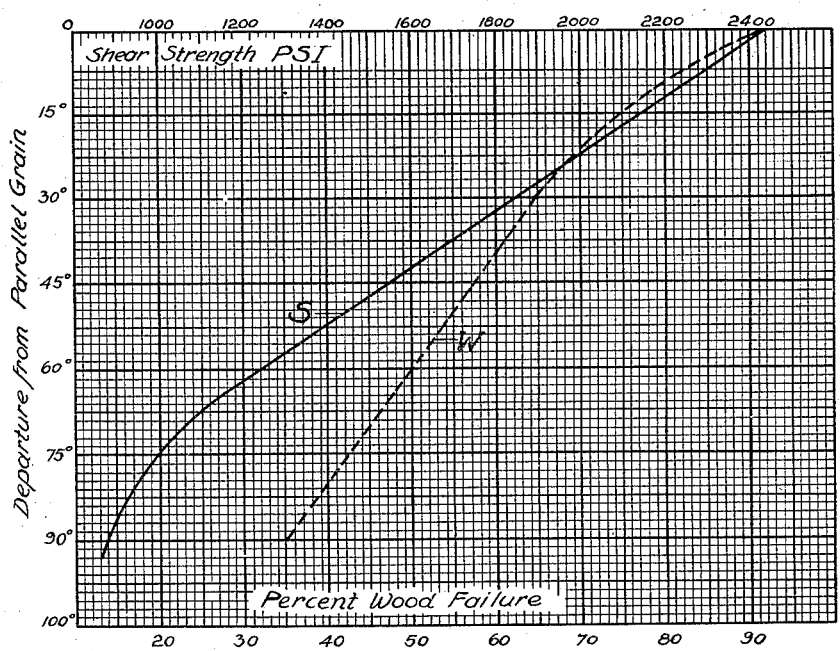
Fig. 3 is a graph indicating, among other things, the effect of the timber angle on the strength of a joint.

As heretofore constructed, the 45° and 90° joints would be of intermediate and minimum shear strength respectively in relation to the maximum strength obtainable in a joint formed by gluing any two of the beams when arranged in parallel so as to have a zero timber angle. This may be readily demonstrated from the curves shown in Fig. 3, the data for which was secured as follows: 10 pairs of wooden blocks, each 2" long x 1½" wide x ¾" thick, were cut; the side faces of each pair were glued together with their long grain lines parallel so as to have a zero timber angle; and each pair was placed in a machine designed to shear it along the glue line or along the glued faces, loaded to breakage and the breakage load noted. Additionally the broken blocks were examined to determine the extent to which the wood failed as distinguished from a glue failure, these extents being estimated. Identical tests were repeated with other blocks which were identical except that the timber angle in one set of ten pairs of blocks was 15°, in another 30°, and in other sets ranged from 45° up to 90° at 15° intervals. From the shear curve S it will be observed that the shear strength decreased from a maximum in excess of 2,400 pounds per square inch of joint area with a zero timber angle progressively to a minimum approximating 900 pounds with a timber angle of 90°. From the wood failure curve W it will also be observed that there was a maximum wood failure and a minimum glue failure with a zero timber angle and that the percent of wood failure decreased while the glue failure increased as the timber angle increased. From this it becomes evident that the timber angle has a decided effect upon the strength of the joint.

While the reason for this loss in shear strength is not definitely known, the foregoing appears to support my theory that it is not possible to secure maximum shear strength in a glue bond between two timbers unless the longitudinal grain lines, in the major faces joined, are parallel to each other and that the loss in shear strength, or the departure from maximum strength, is directly proportional to the magnitude of the "joint grain angle," i. e., the angle formed at the joint by and between the longitudinal grain lines of the major faces joined. Since timbers are always cut in a fashion such that their major faces always present longitudinal grain lines extending in a direction parallel to their long axes, the magnitude of the timber angle has heretofore determined the magnitude of the joint grain angle, both angles being the same or substantially the same in any one joint. The term "major face," as used herein, designates a face presenting longitudinal grain lines as distinguished from a minor face or end face having cross grain or end grain.

In accordance with my invention, the timbers, of a joint having a given timber angle, are not directly bonded to each other but are bonded to the major faces of an interposed veneer or plywood panel whose longitudinal grain lines intersect the timber angle and thereby provide the joint with two or more, preferably equal, joint grain angles which are smaller than any joint grain angle that might be formed by bonding the timbers directly together. The invention thus renders the magnitude of the joint grain angle independent of the timber angle and makes it possible to decrease the joint grain angle to any given value within practical limits, of course.

Figure 4:
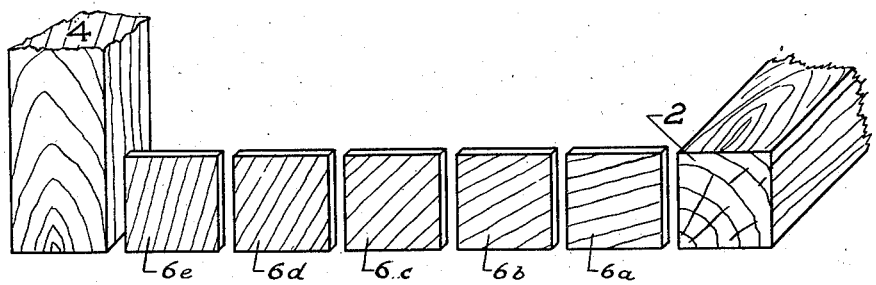
Fig. 4 is an exploded view of a 5 ply wood panel such as is interposed in one of the 90° joints shown in Figures 1 and 2.

In carrying out the invention, a joint grain angle reducing panel 6 is interposed between and glue bonded to the opposed joint areas in the major faces of the timbers. The term "joint area" refers to the joint forming portion of the major face of each timber which is to be bonded. While the panel 6 may be composed of any desirable number of plies, the panels illustrated in the drawings have a sufficient number of plies to reduce the effective joint grain angle to a value approximating 15°. Thus, as shown in Figures 1 and 2, each joint, having a timber angle of 90°, is provided with an interposed panel having five plies. As indicated in the exploded view of Fig. 4, these plies (individually designated 6a to 6e) are so arranged that their longitudinal grain lines cooperate with each other to form four successive 15° joint grain angles. The outer faces of this interposed panel are bonded to the joint areas of the major faces of the timbers with the longitudinal grain lines of each outer face of the panel cooperating with the longitudinal grain lines in the adjacent major face of the timber, to which it is directly bonded, to form two more 15° joint grain angles, one at each bonded face of the panel. In this way, proceeding from one timber to the other, there is a succession of six 15° joint grain angles so that each set of longitudinal grain lines in the joint is directly bonded to another set of longitudinal joint grain lines with an angle of 15° therebetween. In the 45° timber angle shown in Figures 1 and 2, a two ply panel is similarly employed to provide a succession of three 15° angles from one timber to the other, the two plies forming one 15° angle between them and the outer face of each ply cooperating with the adjacent timber to form another 15° angle on each side of the panel. Of course, it will be understood that all of the joint grain angles thus formed in a joint need not be equal and that the panels used may be such as to reduce the effective joint grain angle to some value other than 15°.

The panels preferably conform in shape to the shape of the joint area; hence may be rectangular or square at 90° joints and diamond shaped at 45° joints. Of course, they may be manufactured in standard shapes and sizes and then cut at the job to the appropriate shape and size. They may be of any suitable thickness but preferably are made reasonably thin as, for example, out of veneer which may be less than one-quarter inch thick. I prefer to employ the same over-all thickness in all panels regardless of the number of plies and therefore show, in the drawings, five ply and two ply panels of the same over-all thickness. This is not essential but it has the advantage of spacing all joined timbers equal distances apart and thus facilitating both the design and the fabrication of a truss or frame. Where the joint grain angle reducing panel 6 contains more than one ply, the plies may be bonded together as a unit before being used in a joint.

After a joint grain angle reducing panel, having an appropriate number of plies and a shape which preferably conforms to the shape of the joint area, is interposed between and initially glued to the opposed joint areas of the timbers, the timbers are then pressed or clamped firmly against the panel and held until the glue sets. It will be understood that the glue employed should be of the character commonly employed, or suited for use, in the gluing of laminated beams and other load-bearing members. The particular type of glue best suited for use will, as is well-known, depend upon the intended use of the final product, moisture conditions, cost, and the technical characteristics of the glue itself. At the present time, synthetic resinous glues of the low temperature phenolic type are well suited for use in practicing this invention.

Having described my invention I claim:

1. In a wood framework, an angular glued wood joint comprising: a pair of angularly disposed timbers, each having major faces containing longitudinal grain lines and minor faces containing cross or end grain lines, said timbers being arranged so that a major face portion of one timber is directly opposed to a major face portion of the other timber at the location of the proposed joint between them, said opposed portions constituting the major face joint areas; a wood panel, having oppositely disposed major faces, positioned between timbers with one face adjacent one joint area and bonded thereto, with its opposite face adjacent the opposed joint area and bonded thereto, and with longitudinal grain lines of the panel cooperating with longitudinal grain lines of the opposed joint areas to form an effective joint grain angle which is smaller than the angle formed by and between the longitudinal grain lines of the joint areas.

2. In a wood framework, an angular glued wood joint comprising: a pair of angularly disposed timbers, each having major faces containing longitudinal grain lines and minor faces containing cross or end grain lines, said timbers being arranged so that a major face portion of one timber is directly opposed to a major face portion of the other timber at the location of the proposed joint between them, said opposed portions constituting the major face joint areas; and a joint grain angle reducing wood panel, having oppositely disposed major faces bonded directly to the opposed joint areas, said panel having longitudinal grain lines which cooperate with the longitudinal grain lines in said joint areas to provide an effective joint grain angle which is smaller than the angle formed by and between the longitudinal grain lines of the joint areas.

3. The joint of claim 2 wherein the panel is composed of a succession of two or more plies bonded together and so arranged that, beginning with one of the outer plies which is bonded to one adjacent timber and proceeding successively through the plies, the longitudinal grain lines of the successive plies cooperate with the corresponding grain lines of said one adjacent timber to form successively larger angles substantially within the angle formed by said timbers.

CORNELIUS D. DOSKER.